US009623759B2

(12) United States Patent
Ichikawa et al.

(10) Patent No.: US 9,623,759 B2
(45) Date of Patent: Apr. 18, 2017

(54) NON-CONTACT ELECTRIC POWER TRANSMISSION SYSTEM AND CHARGING STATION

(71) Applicant: TOYOTA JIDOSHA KABUSHIKI KAISHA, Toyota-shi, Aichi-ken (JP)

(72) Inventors: Shinji Ichikawa, Toyota (JP); Satoshi Taniguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 14/581,725

(22) Filed: Dec. 23, 2014

(65) Prior Publication Data

US 2015/0217647 A1 Aug. 6, 2015

(30) Foreign Application Priority Data

Jan. 31, 2014 (JP) ................................. 2014-017142

(51) Int. Cl.
*H02J 7/00* (2006.01)
*B60L 11/18* (2006.01)

(52) U.S. Cl.
CPC ......... *B60L 11/182* (2013.01); *B60L 11/1827* (2013.01); *B60L 11/1829* (2013.01); *B60L 11/1831* (2013.01); *B60L 11/1833* (2013.01); *B60L 11/1838* (2013.01); *B60L 2250/16* (2013.01); *Y02T 10/7005* (2013.01); *Y02T 10/7072* (2013.01); *Y02T 90/121* (2013.01); (Continued)

(58) Field of Classification Search
CPC .......... H02J 5/005; H02J 7/025; H02J 7/0027;
B60L 11/1838; B60L 2230/00; B60L 2230/34; Y02T 90/125; Y02T 90/164; Y02T 90/165; Y02T 90/166
USPC ....................................................... 320/108
See application file for complete search history.

(56) References Cited

U.S. PATENT DOCUMENTS 5,821,731 A * 10/1998 Kuki ................... B60L 11/1805
320/108
7,741,734 B2 6/2010 Joannopoulos et al.
(Continued)

FOREIGN PATENT DOCUMENTS

AU 2006269374 B2 1/2007
AU 2006269374 C1 1/2007
(Continued)

*Primary Examiner* — Arun Williams
(74) *Attorney, Agent, or Firm* — Oliff PLC (57) ABSTRACT

A charging station includes a plurality of electric power transmission portions and a power supply ECU controlling electric power transmission from the plurality of electric power transmission portions. The power supply ECU performs pairing processing for determining a first electric power transmission portion after a vehicle completes positioning with respect to the first electric power transmission portion, checks whether or not positional relation between the first electric power transmission portion and a electric power reception portion of the vehicle satisfies an electric power reception condition after the pairing processing is performed and immediately before electric power transmission from the first electric power transmission portion to the vehicle is started, and allows the first electric power transmission portion to start electric power transmission to the vehicle when the positional relation satisfies the electric power reception condition.

5 Claims, 6 Drawing Sheets

(52) U.S. Cl.
CPC ............ *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 2007/0222542 A1 | 9/2007 | Joannopoulos et al. |
| 2008/0197802 A1* | 8/2008 | Onishi ................... H02J 5/005 320/106 |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0285349 A1 | 11/2011 | Widmer et al. |
| 2013/0038272 A1 | 2/2013 | Sagata |
| 2013/0127409 A1 | 5/2013 | Ichikawa |
| 2013/0193749 A1 | 8/2013 | Nakamura et al. |
| 2014/0015328 A1 | 1/2014 | Beaver et al. |
| 2014/0035522 A1 | 2/2014 | Oishi |
| 2014/0097671 A1 | 4/2014 | Nakamura et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 216 870 A2 | 8/2010 |
| IN | 735/DELNP/2008 | 5/2008 |
| IN | 6195/DELNP/2009 | 7/2010 |
| JP | A-2009-501510 | 1/2009 |
| JP | 2011-254633 A | 12/2011 |
| JP | A-2013-110822 | 6/2013 |
| JP | A-2013-126327 | 6/2013 |
| JP | A-2013-132170 | 7/2013 |
| JP | A-2013-135572 | 7/2013 |
| JP | A-2013-146148 | 7/2013 |
| JP | A-2013-146154 | 7/2013 |
| JP | A-2013-154815 | 8/2013 |
| JP | 2013-225969 A | 10/2013 |
| JP | 2013-247796 A | 12/2013 |
| JP | 2013-247811 A | 12/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | 2012/086048 A1 | 6/2012 |
| WO | 2012/111127 A1 | 8/2012 |
| WO | 2012/176264 A1 | 12/2012 |
| WO | WO 2013/108108 A2 | 7/2013 |

* cited by examiner

NON-CONTACT ELECTRIC POWER TRANSMISSION SYSTEM AND CHARGING STATION

This nonprovisional application is based on Japanese Patent Application No. 2014-017142 filed with the Japan Patent Office on Jan. 31, 2014, the entire contents of which are hereby incorporated by reference.

BACKGROUND OF THE INVENTION

Field of the Invention

The present invention relates to a non-contact electric power transmission system and a charging station.

Description of the Background Art

Japanese Patent Laying-Open No. 2013-135572 discloses a non-contact charging system in which electric power is transmitted from a vehicle to a charging station in a non-contact manner. In the non-contact charging system, positioning between an electric power transmission portion of the charging station and an electric power reception portion of the vehicle is carried out in order to enhance efficiency in electric power transmission and reception.

In spite of positioning as disclosed in the publication above, however, it is also possible that charging is not carried out immediately after positioning. For example, in spite of completion of positioning at the time of parking, a weight may vary when a passenger gets off a vehicle or a vehicle is unloaded subsequently, and in particular, a height of the vehicle may vary and efficiency in electric power transmission and reception may consequently be varied. When charging is started after lapse of some time since completion of positioning owing to timer setting, a position may have been displaced due to application of external force during parking.

Displacement of a position of a vehicle results in position displacement between an electric power transmission coil and an electric power reception coil at the time of start of full-scale charging. When electric power is transmitted similarly to a case of good positioning with the position having been displaced, electric power transmission efficiency may lower or an electric power transmission device may be damaged by reflected electric power.

A charging station may also be configured such that a single control unit controls a plurality of electric power transmission coils. In such a configuration, an electric power transmission coil at a position where a vehicle is stopped should be determined and then full-scale charging should be carried out. In such a case, processing for determining an electric power transmission coil and positioning processing are required, however, the problem of position displacement after completion of positioning above should similarly be overcome.

SUMMARY OF THE INVENTION

An object of this invention is to provide a non-contact electric power transmission system achieving prevention of lowering in electric power transmission efficiency and suppression of damage of an electric power transmission device by reflected electric power, and a charging station.

In summary, this invention is directed to a non-contact electric power transmission system including a vehicle including an electric power reception portion and a charging station. The charging station includes an electric power transmission portion which can transmit electric power to the vehicle in a non-contact manner and an electric power transmission control unit controlling electric power transmission from the electric power transmission portion. The electric power transmission control unit performs pairing processing for determining the electric power transmission portion after the vehicle completes positioning with respect to the electric power transmission portion, checks whether or not positional relation between the electric power transmission portion and the electric power reception portion of the vehicle satisfies an electric power reception condition after the pairing processing is performed and before electric power transmission from the electric power transmission portion to the vehicle is started, and allows the electric power transmission portion to start electric power transmission to the vehicle when the positional relation satisfies the electric power reception condition.

According to such a configuration, after positioning with an electric power transmission portion is completed, pairing processing is performed. Charging with efficiency having been lowered due to position displacement after the vehicle has been determined to receive electric power from that electric power transmission portion can be avoided.

Preferably, a plurality of electric power transmission portions are provided in the charging station. The electric power transmission portion with which the vehicle has completed positioning is a first electric power transmission portion of the plurality of electric power transmission portions. The vehicle transmits a first signal to the charging station when positioning with respect to the first electric power transmission portion is completed. The electric power transmission control unit allows electric power transmission with a time period for supply from the plurality of electric power transmission portions being differed for each electric power transmission portion, upon reception of the first signal. The vehicle transmits a second signal indicating the first electric power transmission portion to the electric power transmission control unit when a time period for supply of received electric power indicates the first electric power transmission portion, and the electric power transmission control unit determines, based on the second signal, that the electric power transmission portion where the vehicle has stopped is the first electric power transmission portion.

Preferably, a plurality of electric power transmission portions are provided in the charging station. The electric power transmission portion with which the vehicle has completed positioning is a first electric power transmission portion of the plurality of electric power transmission portions. The vehicle transmits a first signal to the charging station when positioning with respect to the first electric power transmission portion is completed. The electric power transmission control unit allows electric power transmission with the number of times of switching between on and off of electric power transmission from the plurality of electric power transmission portions being differed for each electric power transmission portion, upon reception of the first signal. The vehicle transmits a third signal indicating the first electric power transmission portion to the electric power transmission control unit when the number of times of switching between on and off of received electric power indicates the first electric power transmission portion. The electric power transmission control unit determines, based on the third signal, that the electric power transmission portion where the vehicle has stopped is the first electric power transmission portion.

The electric power transmission control unit allows the electric power transmission portion to transmit first electric power as processing for checking whether or not positional relation between the electric power transmission portion and the electric power reception portion satisfies the electric power reception condition, and allows the electric power transmission portion to start transmission of second electric power higher than the first electric power to the vehicle when a received voltage received by the electric power reception portion from the electric power transmission portion is equal to or higher than a prescribed value.

In another aspect, this invention is directed to a charging station including an electric power transmission portion which can transmit electric power to a vehicle in a non-contact manner and an electric power transmission control unit controlling electric power transmission from the electric power transmission portion. The electric power transmission control unit performs pairing processing for determining the electric power transmission portion after the vehicle completes positioning with respect to the electric power transmission portion, checks whether or not positional relation between the electric power transmission portion and an electric power reception portion of the vehicle satisfies an electric power reception condition after the pairing processing is performed and before electric power transmission from the electric power transmission portion to the vehicle is started, and allows the electric power transmission portion to start electric power transmission to the vehicle when the positional relation satisfies the electric power reception condition.

According to the present invention, in a vehicle receiving electric power from an electric power transmission device in a non-contact manner, lowering in electric power transmission efficiency can be prevented and damage of the electric power transmission device by reflected electric power can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter in detail with reference to the drawings. The same or corresponding elements in the drawings below have the same reference characters allotted and description thereof will not be repeated.

Description of Overview of Non-Contact Electric Power Transmission System

Figure 1:
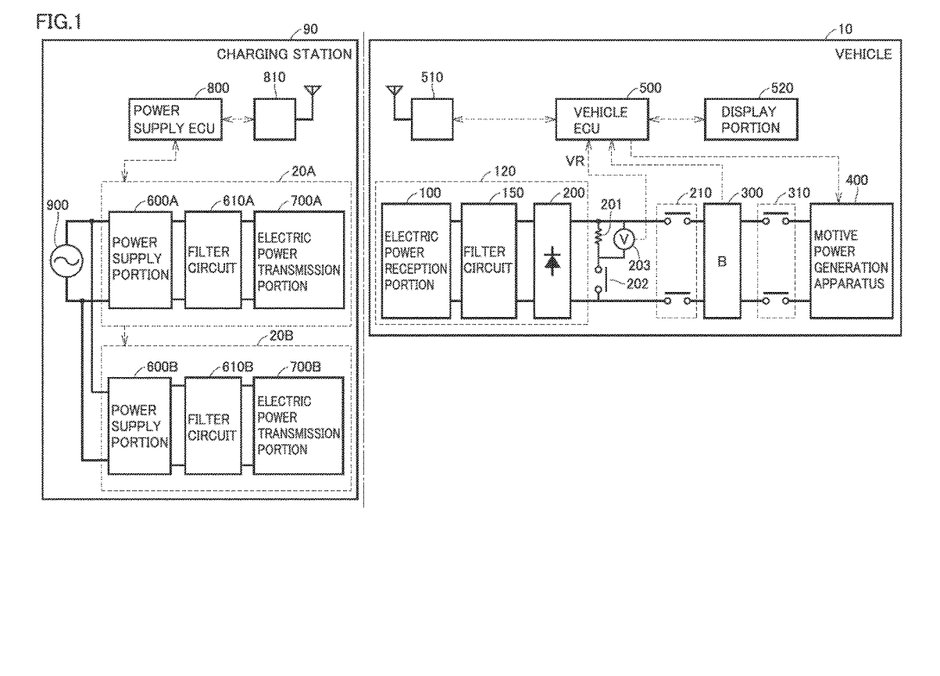
FIG. 1 is an overall configuration diagram of a non-contact electric power transmission system representing one example of an embodiment of the present invention.
Figure 2:
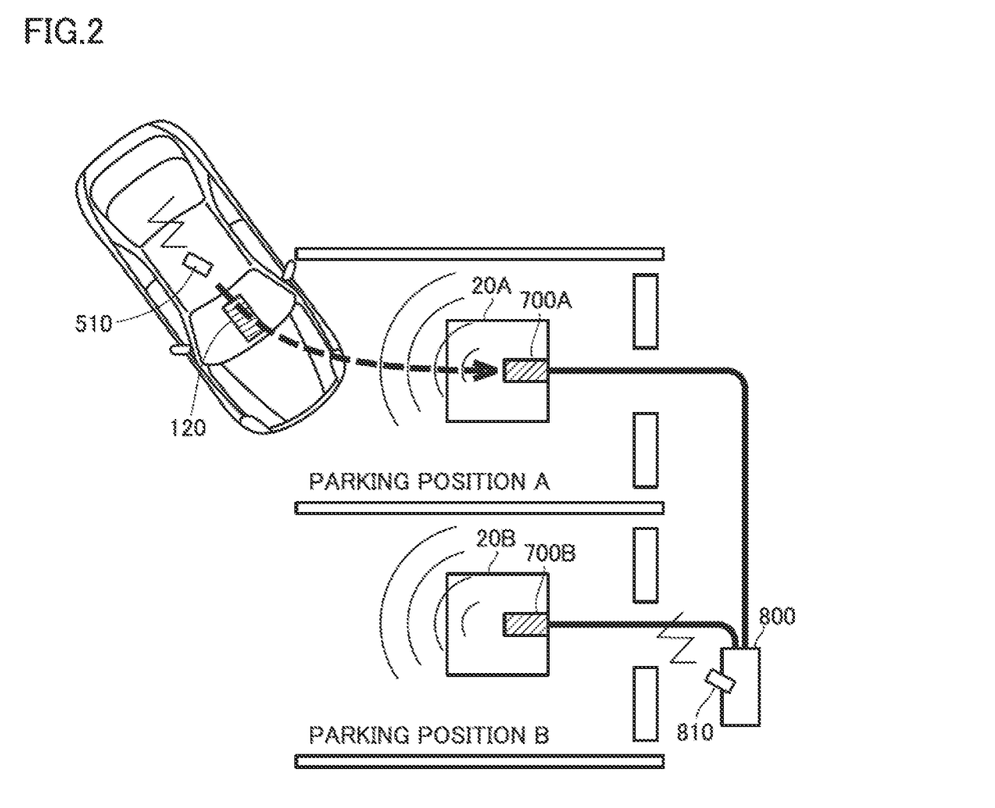
FIG. 2 is a diagram for illustrating parking of a vehicle at a parking position within a charging station.

FIG. 1 is an overall configuration diagram of a non-contact electric power transmission system representing one example of an embodiment of the present invention. FIG. 2 is a diagram for illustrating parking of a vehicle at a parking position within a charging station. Initially, overview of the present embodiment will be described with reference to FIGS. 1 and 2.

Referring to FIGS. 1 and 2, a non-contact electric power transmission system in the present embodiment includes a vehicle 10 including an electric power reception portion 100 and a charging station 90. Charging station 90 includes a plurality of electric power transmission portions 700A and 700B which can transmit electric power to vehicle 10 in a non-contact manner and an electric power transmission control unit (a power supply ECU 800) controlling electric power transmission from the plurality of electric power transmission portions 700A and 700B. Power supply ECU 800 performs pairing processing for determining electric power transmission portion 700A after vehicle 10 completes positioning with electric power transmission portion 700A of the plurality of electric power transmission portions 700A and 700B, checks whether or not positional relation between electric power transmission portion 700A and the electric power reception portion of vehicle 10 satisfies an electric power reception condition after pairing processing is performed and before (preferably immediately before) electric power transmission from electric power transmission portion 700A to vehicle 10 is started, and allows electric power transmission portion 700A to start electric power transmission to vehicle 10 when positional relation satisfies the electric power reception condition.

According to such a configuration, after positioning with electric power transmission portion 700A is completed, pairing processing is performed. Charging with efficiency having been lowered in spite of position displacement after vehicle 10 has been determined to receive electric power from electric power transmission portion 700A can be avoided. Though FIG. 1 shows an example where there are two electric power transmission portions in the charging station, there may be a single electric power transmission portion in the charging station, and a similar effect is obtained. A similar effect is obtained also when there are three or more electric power transmission portions in the charging station.

Figure 3:
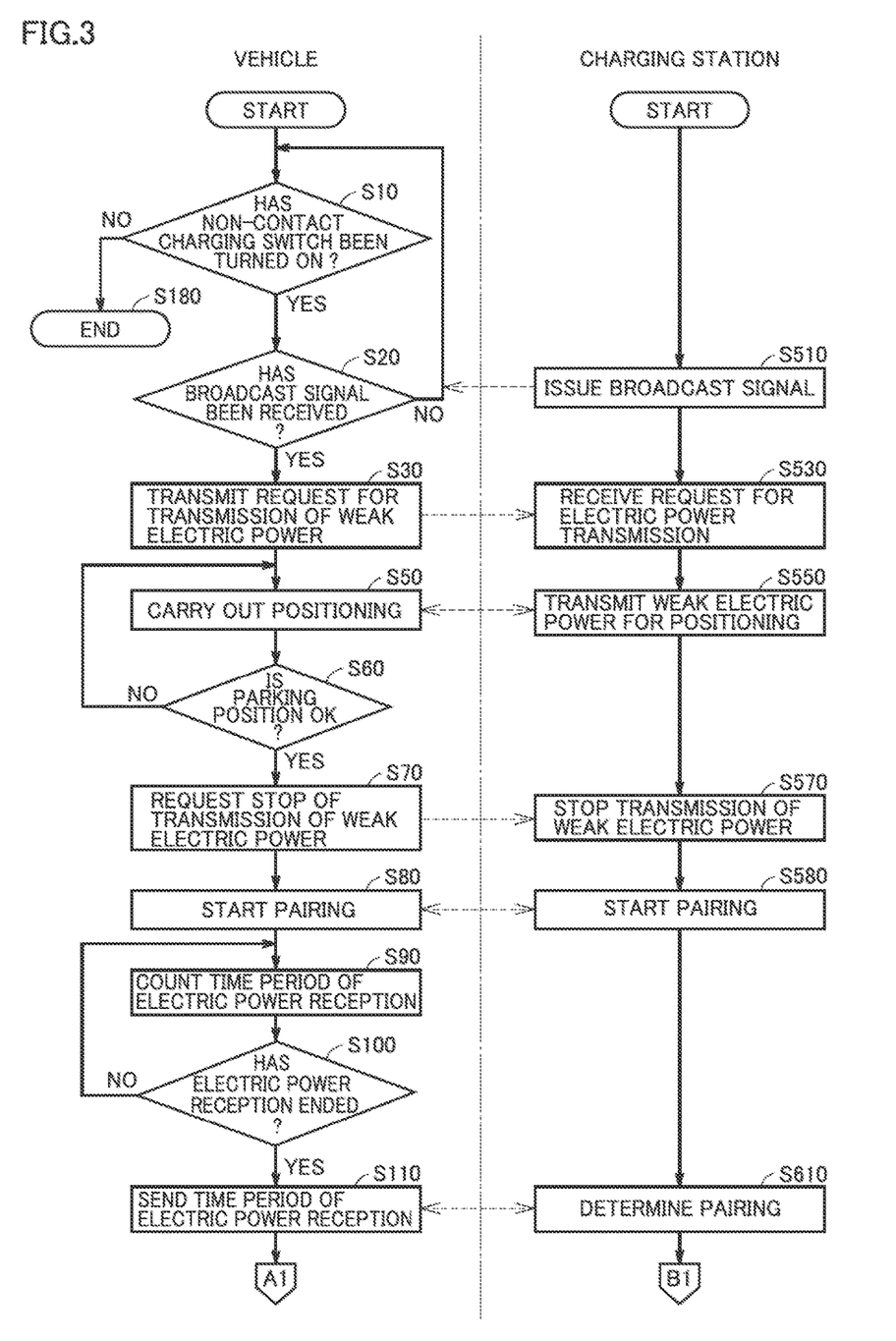
FIG. 3 is a flowchart (a first half) for illustrating overview of processing performed by a vehicle 10 and a charging station 90 in non-contact electric power transmission.

Preferably, vehicle 10 transmits a first signal indicating completion of positioning to charging station 90 when positioning with electric power transmission portion 700A is completed (S70 in FIG. 3). Power supply ECU 800 allows electric power transmission with a time period for supply from the plurality of electric power transmission portions 700A and 700B being differed for each electric power transmission portion (with a time period for electric power transmission being differed as TA and TB as shown with t4 to t6 in FIG. 5), upon reception of the first signal. Vehicle 10 transmits a second signal indicating electric power transmission portion 700A to power supply ECU 800 (S110 in FIG. 3) when a time period for supply (TA) of received electric power indicates electric power transmission portion 700A, and power supply ECU 800 determines, based on the second signal, that the electric power transmission portion where vehicle 10 has stopped is electric power transmission portion 700A.

In another example, preferably, vehicle 10 transmits the first signal to charging station 90 (S70 in FIG. 3) when positioning with electric power transmission portion 700A is completed. Power supply ECU 800 allows electric power transmission with the number of times of switching between on and off of electric power transmission from the plurality of electric power transmissions being differed for each electric power transmission portion (t4 to t5 in FIG. 6), upon reception of the first signal. Vehicle 10 transmits a third signal indicating electric power transmission portion 700A (the number of times being transmitted, instead of the time period in S110 in FIG. 3) when the number of times of switching between on and off of received electric power indicates electric power transmission portion 700A. The electric power transmission control unit determines, based on the third signal, that the electric power transmission portion where vehicle 10 has stopped is electric power transmission portion 700A.

Power supply ECU 800 allows electric power transmission portion 700A to transmit weak electric power as processing for checking whether or not positional relation between electric power transmission portion 700A and the electric power reception portion satisfies the electric power reception condition, and allows electric power transmission portion 700A to start transmission of electric power higher than weak electric power to vehicle 10 when a received voltage VR received by the electric power reception portion from electric power transmission portion 700A is equal to or higher than a prescribed value. Weak electric power is used for checking positioning or absence of position displacement, and full-scale electric power transmission for charging of a power storage device 300 with electric power higher than the weak electric power is carried out.

Details of each feature in the non-contact electric power transmission system will now further be described.

Detailed Configuration of Non-Contact Electric Power Transmission System

Referring to FIG. 1, the non-contact electric power transmission system in the present embodiment is constituted of vehicle 10 on which an electric power reception device 120 configured to be able to receive electric power in a non-contact manner is mounted and charging station 90 including electric power transmission devices 20A and 20B transmitting electric power from the outside of the vehicle to electric power reception portion 100.

Vehicle 10 includes electric power reception device 120, power storage device 300, a motive power generation apparatus 400, a communication portion 510, a vehicle ECU 500, and a display portion 520. Electric power reception device 120 includes electric power reception portion 100, a filter circuit 150, and a rectification portion 200.

Charging station 90 includes an external power supply 900, electric power transmission devices 20A and 20B, a communication portion 810, and power supply ECU 800. Electric power transmission devices 20A and 20B include power supply portions 600A and 600B, filter circuits 610A and 610B, and electric power transmission portions 700A and 700B, respectively.

For example, as shown in FIG. 2, electric power transmission devices 20A and 20B are provided on or in the ground at parking positions A and B, respectively, and electric power reception device 120 is arranged in a lower portion of a vehicle body. A location of arrangement of electric power reception device 120 is not limited as such. For example, when electric power transmission devices 20A and 20B are provided above or lateral to vehicle 10, electric power reception device 120 may be provided in an upper portion of the vehicle body or in a peripheral surface (a front surface, a rear surface, and a side surface) of the vehicle body.

Electric power reception portion 100 includes a secondary coil for receiving in a non-contact manner, (AC) electric power output from any of electric power transmission portions 700A and 700B of electric power transmission devices 20A and 20B. Electric power reception portion 100 outputs received electric power to rectification portion 200. Rectification portion 200 rectifies AC power received by electric power reception portion 100 and outputs the AC power to power storage device 300. Filter circuit 150 is provided between electric power reception portion 100 and rectification portion 200 and suppresses harmonic noise generated during electric power reception from any of electric power transmission portions 700A and 700B. Filter circuit 150 is formed, for example, from an LC filter including an inductor and a capacitor.

Power storage device 300 is a rechargeable DC power supply and it is implemented, for example, by such a secondary battery as a lithium ion battery or a nickel metal hydride battery. A voltage of power storage device 300 is, for example, around 200 V. Power storage device 300 stores not only electric power output form rectification portion 200 but also electric power generated by motive power generation apparatus 400. Then, power storage device 300 supplies the stored electric power to motive power generation apparatus 400. A large-capacity capacitor can also be adopted as power storage device 300. Though not particularly illustrated, a DC-DC converter regulating an output voltage from rectification portion 200 may be provided between rectification portion 200 and power storage device 300.

Motive power generation apparatus 400 generates driving force for running of vehicle 10 by using electric power stored in power storage device 300. Though not particularly illustrated, motive power generation apparatus 400 includes, for example, an inverter receiving electric power from power storage device 300, a motor driven by the inverter, and drive wheels driven by the motor. Motive power generation apparatus 400 may include a generator for charging power storage device 300 and an engine which can drive the generator.

Vehicle ECU 500 includes a central processing unit (CPU), a storage device, and an input/output buffer (none of which is shown), receives input of signals from various sensors and outputs control signals to each device, and controls each device in vehicle 10. By way of example, vehicle ECU 500 controls running of vehicle 10 and charging of power storage device 300. Such control is not limited to processing by software and processing with dedicated hardware (electronic circuitry) can also be performed.

A relay 210 is provided between rectification portion 200 and power storage device 300. Relay 210 is turned on by vehicle ECU 500 during charging of power storage device 300 by electric power transmission devices 20A and 20B. A system main relay (SMR) 310 is provided between power storage device 300 and motive power generation apparatus 400. SMR 310 is turned on by vehicle ECU 500 when start-up of motive power generation apparatus 400 is requested.

A relay 202 is provided between rectification portion 200 and relay 210. A voltage VR across opposing ends of a resistor 201 connected in series with relay 202 is detected by a voltage sensor 203, and sent to vehicle ECU 500.

Vehicle ECU 500 communicates with communication portion 810 of charging station 90 through communication portion 510 during charging of power storage device 300 by electric power transmission devices 20A and 20B, and exchanges with power supply ECU 800, information on start/stop of charging or an electric power reception condition of vehicle 10.

Referring to FIGS. 1 and 2, vehicle 10 or charging station 90 determines whether or not the secondary coil within electric power reception device 120 is positioned with respect to a primary coil within electric power transmission device 20A based on a not-shown car-mounted camera or on intensity of received electric power during test electric power transmission (transmission of weak electric power) by electric power transmission portion 700A, and a user is notified of a result through display portion 520. The user moves vehicle 10 such that positional relation between electric power reception device 120 and electric power transmission device 20A is good for electric power transmission and reception based on information obtained from display portion 520. The user does not necessarily have to operate a steering wheel or an accelerator, and vehicle 10 may automatically move for positioning while the user monitors such an operation on display portion 520.

In test electric power transmission with weak electric power, output to such an extent as being used in what is called a specified low power radio station (equal to or lower than $1/100$ of maximum electric power in full-scale electric power transmission used for charging) is preferred.

Referring again to FIG. 1, power supply portions 600A and 600B receive electric power from external power supply 900 such as a commercial system power supply and generate AC power having a prescribed transmission frequency.

Electric power transmission portions 700A and 700B each include a primary coil for non-contact electric power transmission to electric power reception portion 100. Electric power transmission portions 700A and 700B each receive AC power having a transmission frequency from power supply portions 600A and 600B and transmits electric power to electric power reception portion 100 of vehicle 10 in a non-contact manner through electromagnetic field generated around electric power transmission portions 700A and 700B.

Filter circuits 610A and 610B are provided between power supply portions 600A and 600B and electric power transmission portions 700A and 700B, respectively, and suppress harmonic noise generated from power supply portions 600A and 600B. Filter circuits 610A and 610B are each formed from an LC filter including an inductor and a capacitor.

Power supply ECU 800 includes a CPU, a storage device, and an input/output buffer (none of which is shown), receives input of signals from various sensors and outputs control signals to each device, and controls each device in charging station 90. By way of example, power supply ECU 800 controls switching of power supply portions 600A and 600B such that power supply portions 600A and 600B generate AC power having a transmission frequency. Such control is not limited to processing by software and processing with dedicated hardware (electronic circuitry) can also be performed.

Power supply ECU 800 communicates with communication portion 510 of vehicle 10 through communication portion 810 during electric power transmission to vehicle 10, and exchanges with vehicle 10, information on start/stop of charging or an electric power reception condition of vehicle 10.

AC power having a prescribed transmission frequency is supplied from power supply portions 600A and 600B to electric power transmission portions 700A and 700B through filter circuits 610A and 610B. Each of electric power transmission portions 700A and 700B and electric power reception portion 100 of vehicle 10 includes a coil and a capacitor, and is designed to resonate at the transmission frequency. A Q value representing resonance intensity of electric power transmission portions 700A and 700B and electric power reception portion 100 is preferably 100 or higher.

When AC power is supplied from power supply portions 600A and 600B to electric power transmission portions 700A and 700B through filter circuits 610A and 610B, energy (electric power) is transferred from any of electric power transmission portions 700A and 700B to electric power reception portion 100 through electromagnetic field formed between the primary coil included in any of electric power transmission portions 700A and 700B and the secondary coil of electric power reception portion 100. Then, energy (electric power) transferred to electric power reception portion 100 is supplied to power storage device 300 through filter circuit 150 and rectification portion 200.

Though not particularly illustrated, in electric power transmission devices 20A and 20B, an insulating transformer may be provided between electric power transmission portions 700A and 700B and power supply portions 600A and 600B (for example, between electric power transmission portions 700A and 700B and filter circuits 610A and 610B). In vehicle 10 as well, an insulating transformer may be provided between electric power reception portion 100 and rectification portion 200 (for example, between electric power reception portion 100 and filter circuit 150).

Procedure of Non-Contact Electric Power Transmission

Figure 4:
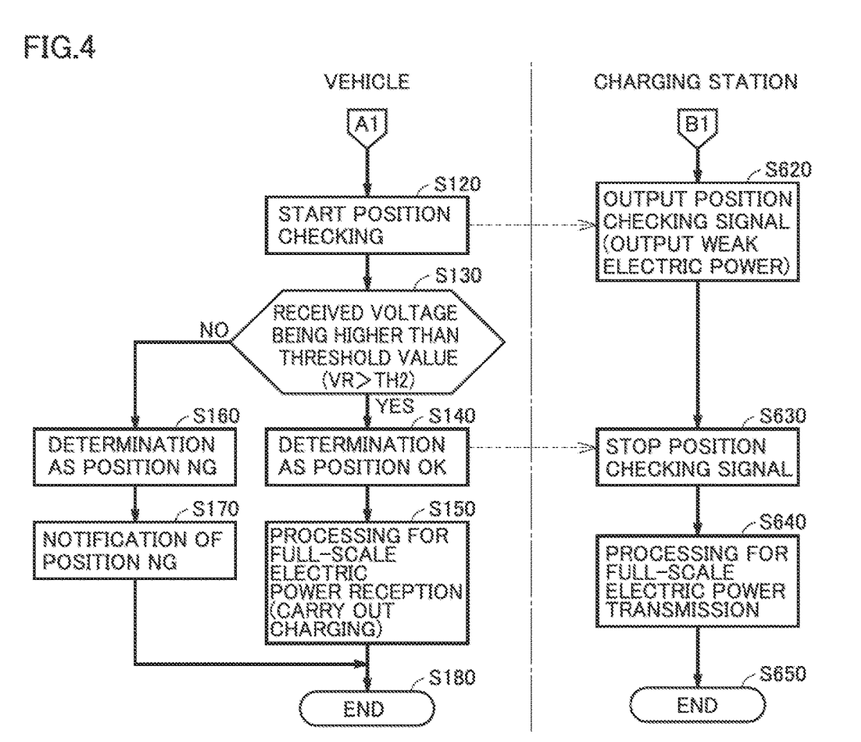
FIG. 4 is a flowchart (a latter half) for illustrating overview of the processing performed by vehicle 10 and charging station 90 in non-contact electric power transmission.
Figure 5:
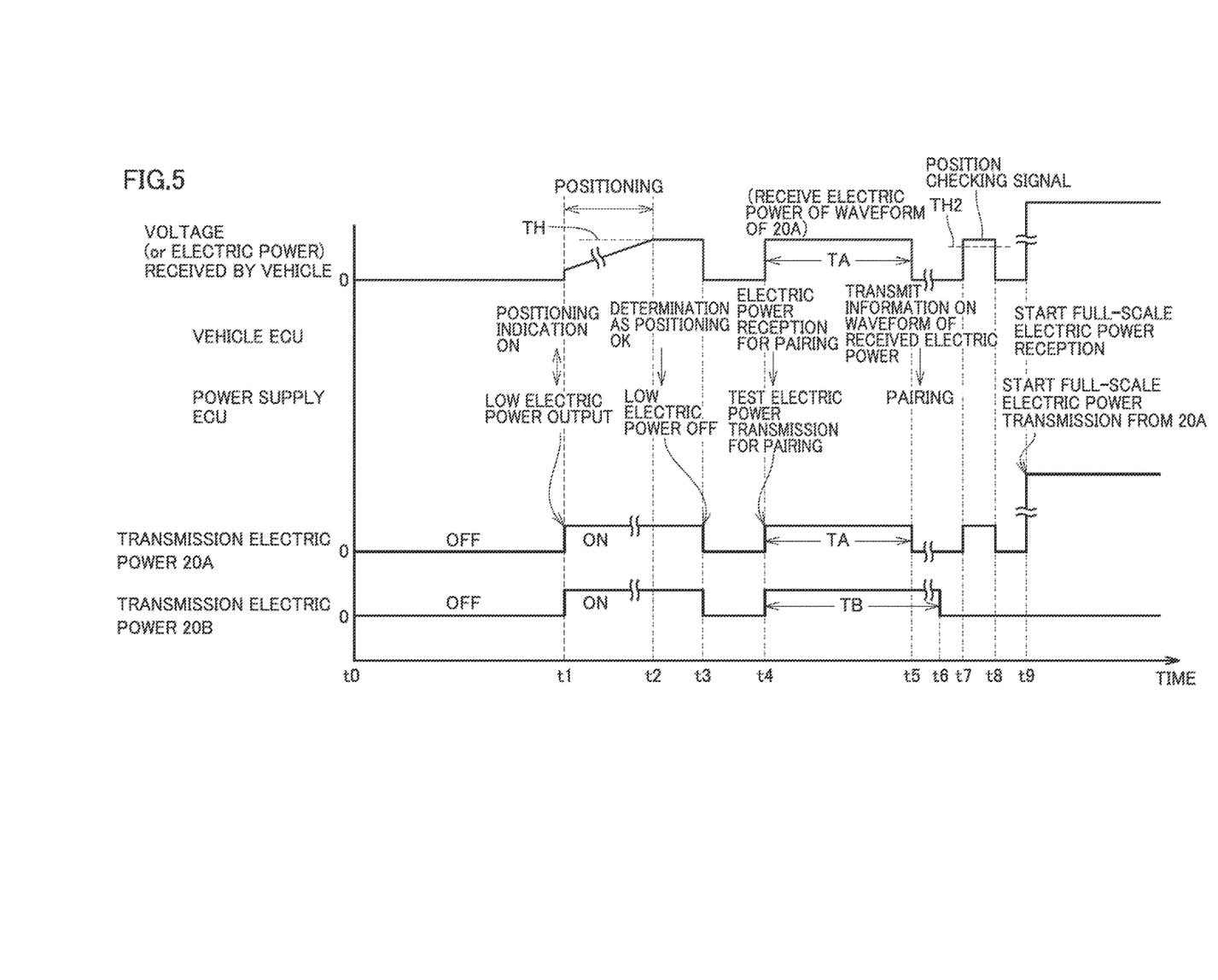
FIG. 5 is a timing chart representing variation in transmission electric power and a received voltage which are varied during the course of the processing in FIGS. 3 and 4.

FIGS. 3 and 4 are flowcharts for illustrating overview of processing performed by vehicle 10 and charging station 90 in non-contact electric power transmission. FIG. 5 is a timing chart representing variation in transmission electric power and a received voltage, which are varied during the course of the processing in FIGS. 3 and 4.

Referring to FIGS. 1, 3, and 5, in the vehicle, whether or not a non-contact charging switch designating whether or not to carry out non-contact charging is ON is determined in step S10. Though not particularly limited, preferably, the non-contact charging switch has automatically been set to ON while the vehicle is started up and the vehicle is configured such that the user can switch setting to OFF.

In step S510, power supply ECU 800 of charging station 90 broadcasts a signal notifying that a situation allows charging when there is an empty parking position.

When vehicle ECU 500 of vehicle 10 receives this signal in step S20, the process proceeds to step S30, and vehicle ECU 500 transmits a signal indicating a request for transmission of weak electric power to charging station 90.

In step S530, power supply ECU 800 of charging station 90 receives the request for electric power transmission.

When charging station 90 receives in step S530 the request for electric power transmission from the vehicle, in response thereto, in charging station 90, electric power transmission devices 20A and 20B transmit in step S550, weak electric power for positioning with electric power reception device 120 (see a time point t1 in FIG. 5).

In step S50, vehicle 10 carries out positioning through automatic or manual movement of vehicle 10 (see time points t1 to t2 in FIG. 5). During positioning, vehicle ECU 500 renders relay 202 conductive and obtains magnitude of received voltage VR which is produced across the opposing ends of resistor 201 and detected by voltage sensor 203.

Since this voltage is lower than a voltage in full-scale electric power transmission, vehicle ECU 500 sets relay 210 to off so as not to be affected by power storage device 300 during detection.

While charging station 90 carries out electric power transmission, in the vehicle, vehicle ECU 500 notifies in step S60 the fact that magnitude of received voltage VR has exceeded a threshold value TH through display portion 520. The user thus recognizes that positioning has been successful. Thereafter, when the user gives a notification that the parking position is OK by pressing a parking switch within vehicle 10, the process proceeds to step S70 (see time point t2 in FIG. 5).

In step S70, vehicle ECU 500 transmits a request for stopping transmission of weak electric power for positioning to charging station 90. In step S570, power supply ECU 800 of charging station 90 receives the request for stopping transmission of weak electric power, and transmission of weak electric power for positioning by electric power transmission devices 20A and 20B ends (see a time point t3 in FIG. 5).

In step S80 and step S580, vehicle ECU 500 and power supply ECU 800 perform pairing processing for checking whether or not positioning with any of electric power transmission devices 20A and 20B has reliably been achieved.

As shown with times t4 to t5 in FIG. 5, power supply ECU 800 allows test electric power transmission for pairing for a supply time TA from electric power transmission portion 700A of electric power transmission device 20A. As shown with times t4 to t6 in FIG. 5, power supply ECU 800 allows test electric power transmission for pairing for a supply time TB from electric power transmission portion 700B of electric power transmission device 20B.

In test electric power transmission used in the pairing processing, as in positioning, output to such an extent as being used in what is called a specified low power radio station (equal to or lower than $1/100$ of maximum output in full-scale electric power transmission used for charging) is preferred.

In FIG. 5, power supply ECU 800 differs a duration of on of transmission electric power for each electric power transmission device. Namely, in transmission of electric power by electric power transmission device 20A, electric power transmission is carried out with transmission electric power being turned on for a time period of TA. In transmission of electric power by electric power transmission device 20B, electric power transmission is carried out with transmission electric power being turned on for a time period of TB (see time points t4 to t6 in FIG. 5).

In steps S90 and S100, vehicle ECU 500 counts the duration of on of received electric power, and in step S110, notifies power supply ECU 800 of the counted duration of on. In the example in FIG. 5, electric power reception device 120 receives transmission electric power from electric power transmission device 20A. Vehicle ECU 500 notifies power supply ECU 800 of the fact that the duration of on of received electric power is TA. Power supply ECU 800 can thus reliably confirm positioning with electric power transmission device 20A.

Referring to FIGS. 1, 4, and 5, when pairing processing is completed, processing for starting position checking is started up in step S120 on the vehicle side. For example, when a scheduled time to start electric power reception set by a charging timer has come, vehicle ECU 500 requests charging station 90 to transmit weak electric power for position checking. In response, the charging station transmits in step S620 a position checking signal from electric power transmission portion 700A paired with the vehicle. As the position checking signal, electric power transmission portion 700A transmits weak electric power similar to that during pairing (see t7 to t8 in FIG. 5).

The vehicle determines in step S130 whether or not received voltage VR exceeds a threshold value TH2. When received voltage YR is higher than threshold value TH2, the process proceeds to step S140 and a position of electric power reception portion 100 is determined as OK (not being displaced in position). When received voltage VR is not higher than threshold value TH2, the process proceeds to step S160 and a position of electric power reception portion 100 is determined as NG (being displaced in position).

When determination in step S140 or S160 is completed, the vehicle notifies the charging station of completion of determination processing, and charging station 90 stops in step S630 transmission of the position checking signal (transmission of weak electric power).

When determination as position OK is made in step S140, in steps S150 and S640, the charging station carries out full-scale electric power transmission and the vehicle performs processing for full-scale electric power reception. In the full-scale electric power reception processing, relay 202 is disconnected and relay 210 is rendered conductive, so that power storage device 300 is charged.

When determination as position NG is made in step S160, the process proceeds to step S170 and the user is notified of position NG through display portion 520 or the like.

When the process above is completed, a series of charging processes ends in step S180 and step S650.

Modification

The present invention is not limited to the embodiment above, and for example, a modification as below is also encompassed.

Figure 6:
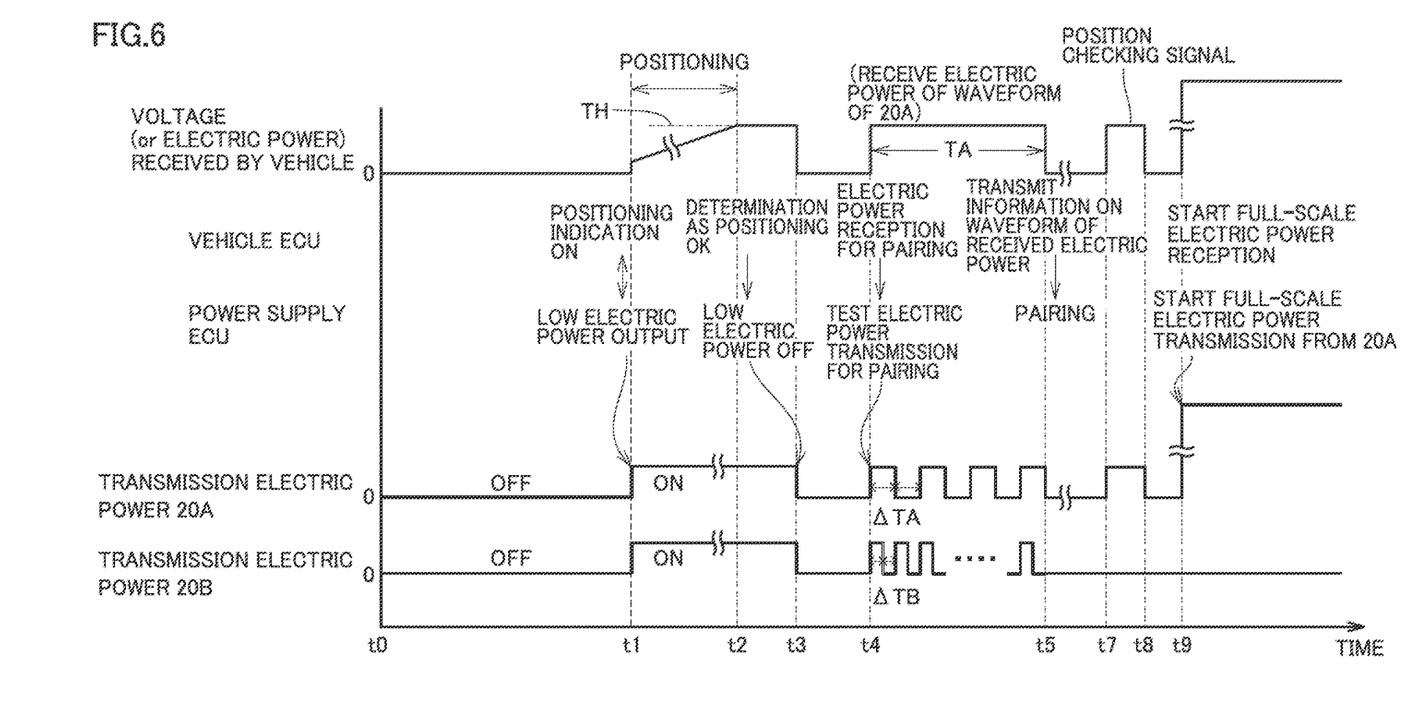
FIG. 6 is a diagram for illustrating a modification of pairing processing.

FIG. 6 is a diagram for illustrating a modification of pairing processing. In FIG. 6, power supply ECU 800 differs a cycle of switching between on and off of transmission electric power for each electric power transmission device. Namely, electric power transmission device 20A switches between on and off of transmission electric power every cycle ΔTA and electric power transmission device 20B switches between on and off of transmission electric power every cycle ΔTB (see time points t4 to t5 in FIG. 6).

Vehicle ECU 500 notifies power supply ECU 800 of a cycle of switching between on and off of received electric power. In the example in FIG. 6, electric power reception device 120 receives transmission electric power from electric power transmission device 20A. Vehicle ECU 500 notifies power supply ECU 800 of the fact that the cycle of switching between on and off of received electric power is set to ΔTA. Power supply ECU 800 thus knows that positioning with electric power transmission device 20A has been completed (see time point t5 in FIG. 6).

In the modification as in FIG. 6 as well, after the pairing processing and immediately before full-scale electric power transmission, as shown with times t7 to t8, weak electric power for position checking processing is transmitted and the vehicle determines intensity of received electric power. Thus, for example, charging in spite of position displacement of a vehicle by the time of start of charging in a case that charging is scheduled by a timer can be prevented.

In the modification in FIG. 6, pairing is achieved with the use of transmission electric power, however, limitation thereto is not intended. Pairing can be achieved with various techniques, and for example, pairing may be achieved by providing a radio frequency identification (RFID) tag and an RFID reader in a vehicle and an electric power transmission portion, respectively, based on an RFID technique.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-contact electric power transmission system, comprising:
 a vehicle including an electric power reception portion; and
 a charging station,
 said charging station including
  an electric power transmission portion configured to transmit electric power to the vehicle in a non-contact manner, and
  an electric power transmission control unit that controls electric power transmission from said electric power transmission portion,
 said electric power transmission control unit performing (i) pairing processing for determining said electric power transmission portion after said vehicle completes positioning with respect to said electric power transmission portion and is parked, (ii) checking whether a positional relation between said electric power transmission portion and said electric power reception portion of said vehicle satisfies an electric power reception condition after said pairing processing is performed and before electric power transmission from said electric power transmission portion to said vehicle is started, and (iii) allowing said electric power transmission portion to start electric power transmission to said vehicle when said positional relation satisfies said electric power reception condition.

2. The non-contact electric power transmission system according to claim 1, wherein
 a plurality of said electric power transmission portions are provided in said charging station,
 the electric power transmission portion with which said vehicle has completed positioning is a first electric power transmission portion of the plurality of electric power transmission portions,
 said vehicle transmits a first signal to said charging station when positioning with respect to said first electric power transmission portion is completed,
 said electric power transmission control unit allows electric power transmission with a time period for supply from said plurality of electric power transmission portions being different for each of the plurality of electric power transmission portions, upon reception of said first signal,
 said vehicle transmits a second signal indicating said first electric power transmission portion to said electric power transmission control unit when a time period for supply of received electric power indicates said first electric power transmission portion, and
 said electric power transmission control unit determines, based on said second signal, that the electric power transmission portion where the vehicle has stopped is said first electric power transmission portion.

3. The non-contact electric power transmission system according to claim 1, wherein
 a plurality of said electric power transmission portions are provided in said charging station,
 the electric power transmission portion with which said vehicle has completed positioning is a first electric power transmission portion of the plurality of electric power transmission portions,
 said vehicle transmits a first signal to said charging station when positioning with respect to said first electric power transmission portion is completed,
 said electric power transmission control unit allows electric power transmission with a number of times of switching between on and off of electric power transmission from said plurality of electric power transmission portions being different for each of the plurality of electric power transmission portions, upon reception of said first signal,
 said vehicle transmits a third signal indicating said first electric power transmission portion to said electric power transmission control unit when the number of times of switching between on and off of received electric power indicates said first electric power transmission portion, and
 said electric power transmission control unit determines, based on said third signal, that the electric power transmission portion where the vehicle has stopped is said first electric power transmission portion.

4. The non-contact electric power transmission system according to claim 1, wherein
 said electric power transmission control unit controls said electric power transmission portion to transmit first electric power to perform the checking of whether the positional relation between said electric power transmission portion and said electric power reception portion satisfies the electric power reception condition, and controls said electric power transmission portion to start transmission of second electric power higher than said first electric power to said vehicle when a received voltage received by said electric power reception portion from said electric power transmission portion transmitting the first electric power is equal to or higher than a prescribed value.

5. A charging station, comprising:
 an electric power transmission portion configured to transmit electric power to a vehicle in a non-contact manner; and
 an electric power transmission control unit that controls electric power transmission from said electric power transmission portion,
 said electric power transmission control unit performing (i) pairing processing for determining said electric power transmission portion after said vehicle completes positioning with respect to said electric power transmission portion and is parked, (ii) checking whether a positional relation between said electric power transmission portion and an electric power reception portion of said vehicle satisfies an electric power reception condition after said pairing processing is performed and before electric power transmission from said electric power transmission portion to said vehicle is started, and (iii) allowing said electric power transmission portion to start electric power transmission to said vehicle when said positional relation satisfies said electric power reception condition.

* * * * *